(12) United States Patent
Tang

(10) Patent No.: US 6,217,179 B1
(45) Date of Patent: Apr. 17, 2001

(54) OPTICAL REFLECTION PANEL

(75) Inventor: Ricke Tang, Taipei Hsien (TW)

(73) Assignee: Umax Data Systems Inc., Hsinchu (TW)

( * ) Notice: Subject to any disclaimer, the term of this patent is extended or adjusted under 35 U.S.C. 154(b) by 0 days.

(21) Appl. No.: 09/619,756

(22) Filed: Jul. 19, 2000

Related U.S. Application Data

(63) Continuation-in-part of application No. 09/243,802, filed on Feb. 3, 1999, now abandoned.

(51) Int. Cl.[7] .............................. G03G 5/08; G03G 7/182; G03G 15/04; H04N 1/04
(52) U.S. Cl. ..................... 359/850; 359/855; 359/857; 359/831; 359/871; 359/883; 359/848; 355/67; 358/494; 358/496; 358/497; 399/221
(58) Field of Search ................................ 359/831, 833, 359/834, 848, 850, 855, 857, 861, 871, 883, 196, 212, 216; 358/474, 494, 496, 497; 399/220, 221; 355/67

(56) References Cited

U.S. PATENT DOCUMENTS

| 35,344 | * | 5/1862 | Willard | ................................ 359/855 |
|---|---|---|---|---|
| 3,484,328 | * | 12/1969 | Austin et al. . | |
| 3,856,384 | * | 12/1974 | Kryzhanousky . | |
| 4,422,893 | * | 12/1983 | Duchateau et al. . | |
| 5,687,017 | * | 11/1997 | Katoh et al. | ......................... 359/855 |

FOREIGN PATENT DOCUMENTS

| 401011219 | * | 1/1989 | (JP) | ..................................... 359/855 |
|---|---|---|---|---|
| 406208076 | * | 7/1994 | (JP) | ..................................... 359/855 |

* cited by examiner

Primary Examiner—Ricky D. Shafer
(74) Attorney, Agent, or Firm—Dougherty & Troxell

(57) ABSTRACT

An optical reflection panel made of thermosetting plastic material as a substrate is disclosed. One surface of the substrate is coated with an adherent layer and then an optical reflecting layer is formed on the adherent layer as a reflecting surface for reflecting a light beam. The other surface of the substrate is formed with a reinforcing structure. The reinforcing structure serves to increase the mechanical strength of the optical reflection panel and control the deformation amount. The reinforcing structure includes a number of reinforcing ribs extending along the longitudinal axis of the optical reflection panel and a number of reinforcing ribs perpendicular to the longitudinal axis of the optical reflection panel.

18 Claims, 7 Drawing Sheets

OPTICAL REFLECTION PANEL

RELATED APPLICATIONS

This application is a Continuation-In-Part of patent application Ser. No. 09/243,802 filed on Feb. 3, 1999, entitled "Optical Reflection Panel", now abandoned.

BACKGROUND OF THE INVENTION

1. Field of the Invention

The present invention relates to an optical reflection panel, and more particularly to an optical reflection panel with a substrate made of thermosetting plastic material. The optical reflection panel additionally includes a reinforcing structure for increasing the mechanical strength of the optical reflection panel.

2. Description of the Prior Art

Many kinds of optical devices, such as image scanner, copier, are widely used nowadays. All these optical devices are equipped with an optical reflection module for reflecting the light beam during image scanning. The conventional optical reflection module used in a commercial optical image scanner generally includes three or four reflection mirrors made of glass therein. FIG. 1 shows the arrangement of the components of a conventional image scanner and the optical path thereof.

The image scanner includes several glass reflection mirrors 11, 12, 13, 14, an optical lens 3 and an image sensing element 4 (such as a conventional Charge Coupling Device, CCD). The four glass reflection mirrors 11, 12, 13, 14 are arranged in an interior space of a conventional optical reflection module 5 as shown in FIG. 2 for reflecting and refracting the light beam 2 during image scanning. The light beam refracted by the glass reflection mirrors 11, 12, 13, and 14 finally will pass through a light passage 52 formed on rear side of the optical reflection module 5 and project onto the optical lens 3 of the image scanner (referring to FIG. 1).

In order to reduce manufacturing cost and material cost of the scanner, the manufacturers always try to research the way to save cost of respective components or the entire frame of the module. However, the conventional optical reflection modules all employ reflection mirrors made of glass material which itself is made at considerably high cost. Therefore, with such conventional glass reflection mirrors, the cost can be reduced only to a quite limited extent.

Furthermore, it is impossible to drill a through hole onto the glass reflection mirror. Therefore, when mounting the glass reflection mirror, such as the mirrors 11, in the optical reflection module 5, it is necessary to form a U-shaped cavity 51 a predetermined position of the module 5 and then insert each end of the glass reflection mirror 11 into the cavity 51 and finally fixedly clamp the glass reflection mirror 11 with a clip 6. Such conventional structure leads to increment of cost for a number of clips and assembling steps.

In addition, when assembling the glass reflection mirror 11 in the housing of the module, the glass reflection mirror is positioned by an inclination angle for optical refraction. It is very difficult to clamp and hold the glass reflection mirror 11 with the clip 6 in a narrow space so that the working efficiency can be hardly promoted.

SUMMARY OF THE INVENTION

It is therefore a primary object of the present invention to provide an optical reflection panel including a thermosetting plastic substrate. The surface of the substrate is processed, whereby one surface of the optical reflection panel is formed as an optical reflection surface instead of the glass reflection mirrors widely used in the existing scanners or copiers. By means of the measure of the present invention, the problems existing in the conventional glass reflection mirrors can be effectively solved and the cost for material can be reduced. Moreover, the assembling procedure can be facilitated and the production efficiency can be greatly promoted.

It is a further object of the present invention to provide an optical reflection panel with a reinforcing structure for increasing the mechanical strength of the optical reflection panel and controlling the deformation amount thereof within a standard of the conventional glass reflection mirrors. Because the optical reflection panel of the present invention is made of a thermosetting plastic substrate, during injection molding, the reinforcing structure can be integrally formed to facilitate the manufacturing of the product.

It is still a further object of the present invention to provide an optical reflection panel with projecting lock lugs so that the reflection panel may be easily mounted in an optical reflection module. The projecting lock lug may be further formed with a through hole. A screw can be passed through the through hole of the lock lug to secure the optical reflection panel on a frame body of the optical reflection module without any clip. Therefore, the assembling procedure is simplified and the cost for the parts is saved.

The present invention can be best understood through the following description and accompanying drawings, wherein:

DETAILED DESCRIPTION OF THE PREFERRED EMBODIMENTS

Figure 1:
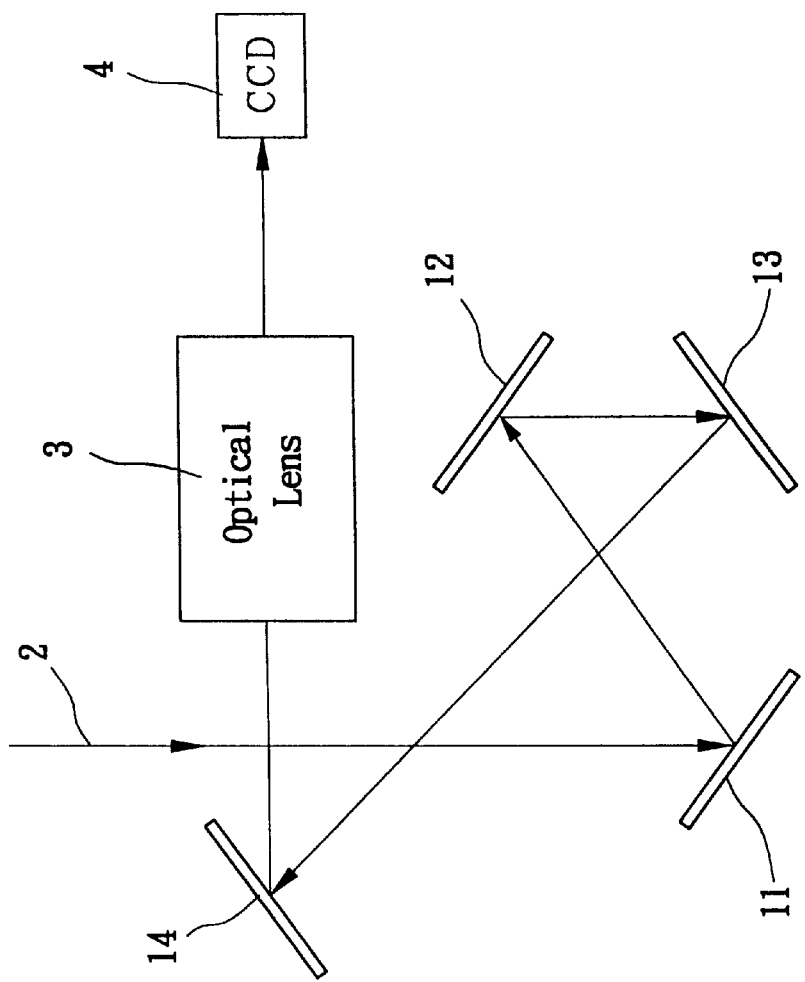
FIG. 1 shows an arrangement of the components of a conventional image scanner and also shows the optical path during the scanning operation.
Figure 2:
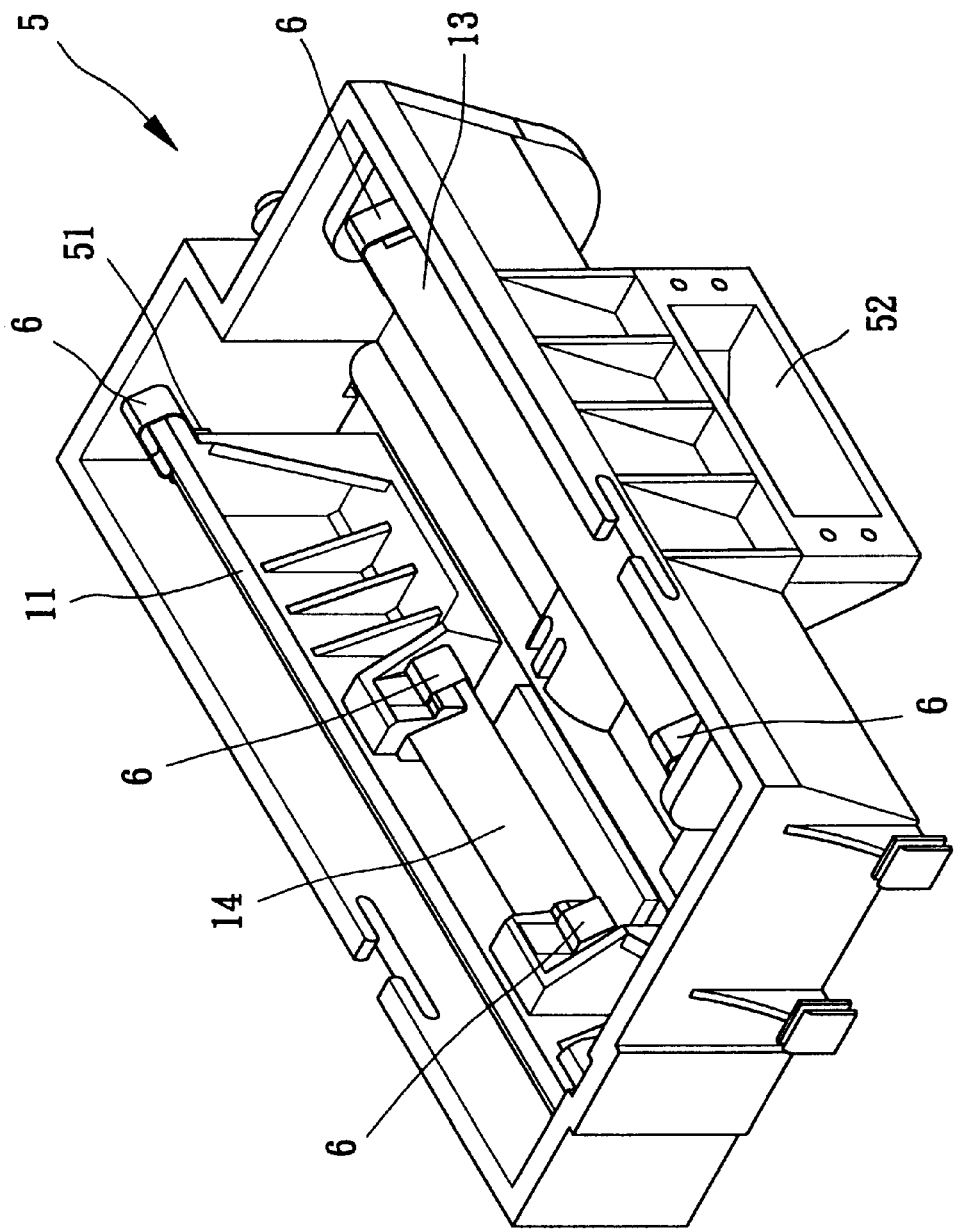
FIG. 2 is a perspective view of a conventional optical reflection module in which glass reflection mirrors are used as reflecting elements for the light beam.
Figure 3:
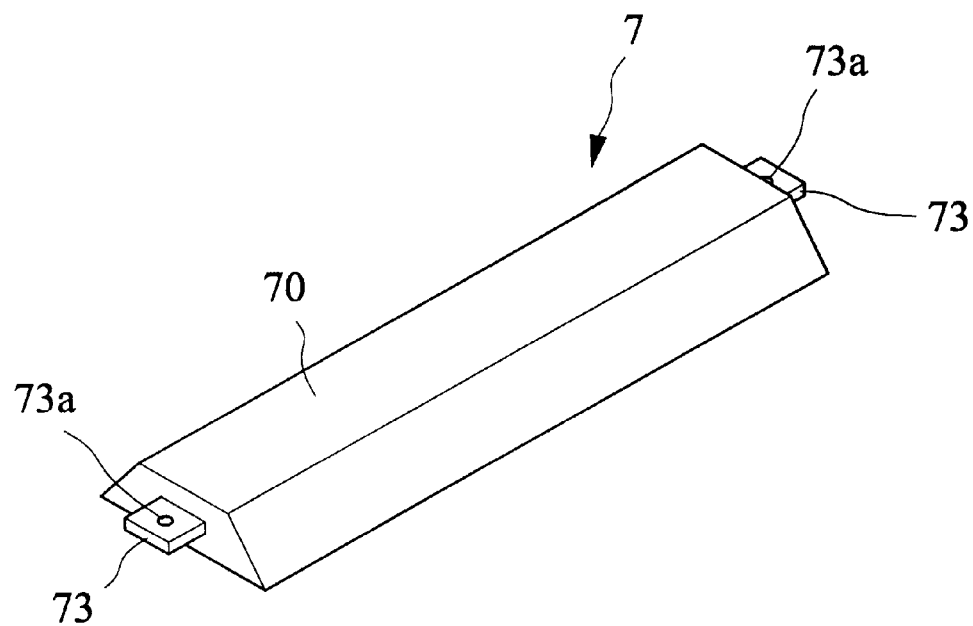
FIG. 3 is a perspective view of a first embodiment of the optical reflection panel of the present invention.
Figure 4:
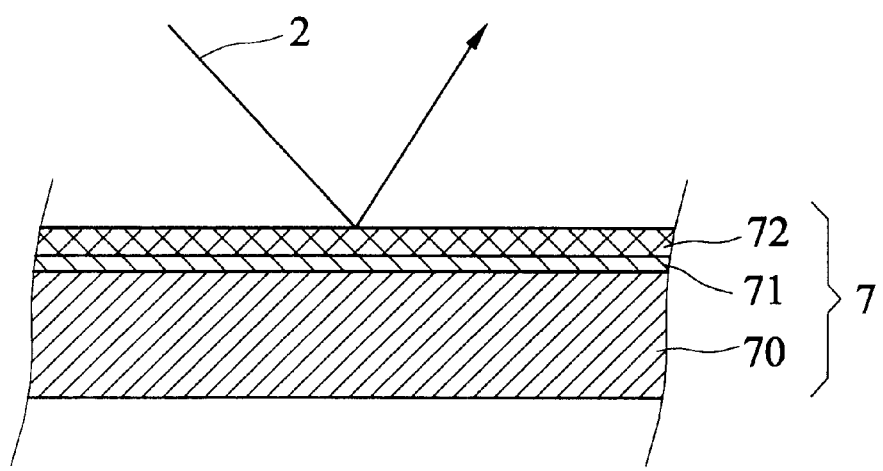
FIG. 4 is a cross sectional view of the optical reflection panel of the present invention.

Please refer to FIG. 3 which shows a first embodiment of the optical reflection panel 7 of the present invention. The optical reflection panel 7 includes a substrate 70 made of thermosetting plastic material. An adherent layer 71 is coated on the top surface of the substrate 70, and then an optical reflection layer 72 is formed on the adherent layer 71, with reference to FIG. 4.

In this embodiment, the optical reflection panel 7 is made of fiber glass-reinforced unsaturated polyester resin (commonly called as BMC molding material) or other thermosetting resin materials. The adherent layer 71 is generally made of for example, cyanuric amine material. The optical reflection layer 72 can employ aluminum or other metal layer serving as a reflection surface for the scanned light beam 2. The adherent layer 71 serves as a medium layer between the top surface of the substrate 70 of the optical reflection panel 7 and the optical reflection layer 72. The adherent layer 71 makes the surface of the substrate 70 more plane and enables the optical reflection layer 72 to be attached to the surface of the substrate 70 of the optical reflection panel 7.

Each end of the optical reflection panel 7 can be easily integrally formed with a projecting lock lug 73 having a through hole 73a. A conventional screw can be passed through the through hole 73a of the lock lug 73 to secure the optical reflection panel 7 on a frame body of the optical reflection module 5.

Figure 5:
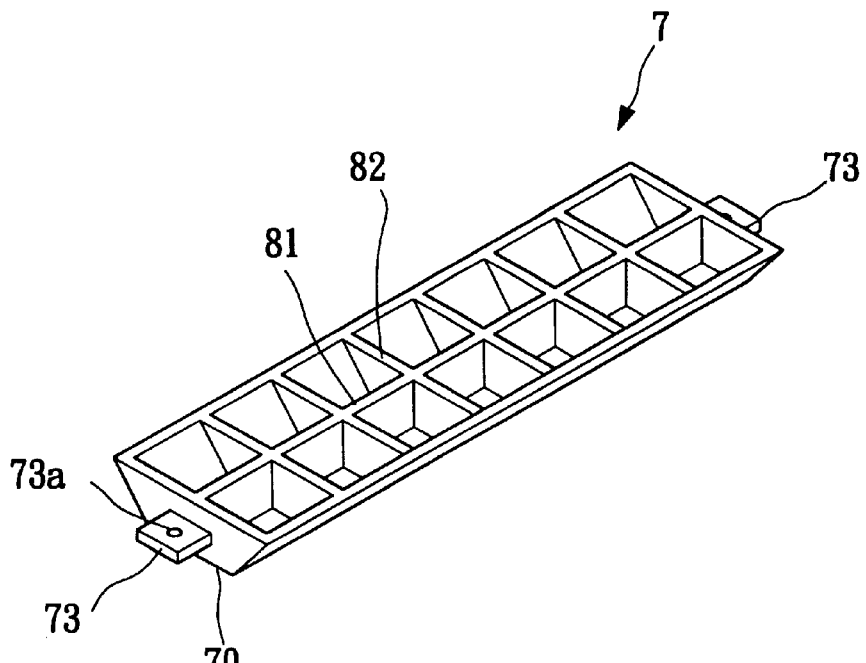
FIG. 5 is a bottom perspective view of the optical reflection panel of FIG. 3, showing a reinforcing structure is formed on the bottom side of the optical reflection panel.

The other surface of the optical reflection panel 7 is molded with a reinforcing structure (as shown in FIG. 5) which includes one or more reinforcing ribs 81 extending along the longitudinal axis of the optical reflection panel 7 and several reinforcing ribs 82 perpendicular to the longitudinal axis. The reinforcing ribs 81, 82 serve to increase the mechanical strength of the optical reflection panel 7. The number of the reinforcing ribs can be adjusted in accordance with actual requirement in manufacturing.

By means of the reinforcing structure, the deformation amount of the optical reflection panel 7 can be controlled to be under 5 um. This meets the standard of deformation amount required by the traditional glass reflection mirror.

Figure 6:
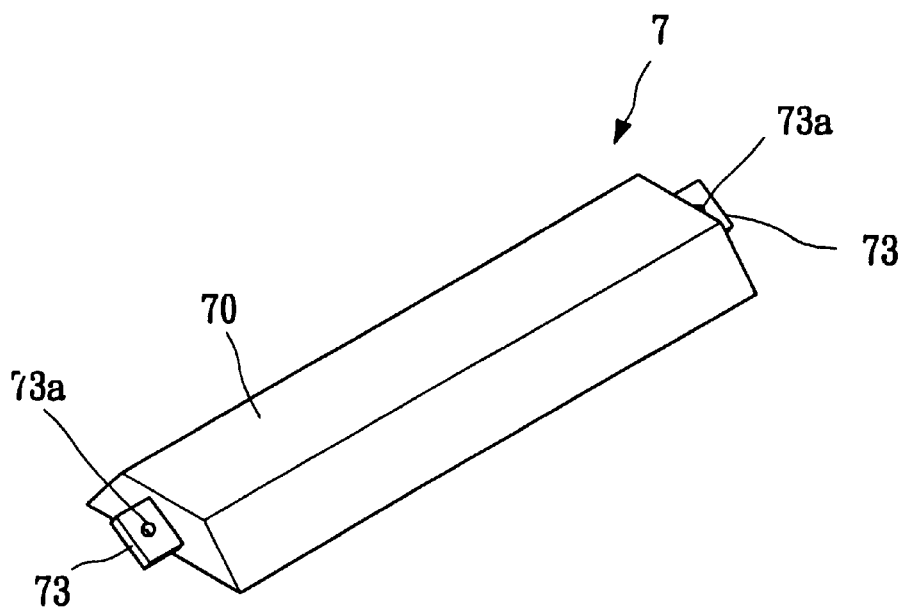
FIG. 6 is a perspective view of a second embodiment of the optical reflection panel of the present invention.

FIG. 6 shows a second embodiment of the optical reflection panel of the present invention. Most parts of the second embodiment are identical to those of the first embodiment. The only difference therebetween resides in that in the first embodiment, the plane of the lock lug 73 is parallel to the reflection surface 70 of the optical reflection panel 7, while in the second embodiment, the plane of the lock lug 73 is inclined from the reflection surface 70 of the optical reflection panel 7 by a certain angle.

Figure 7:
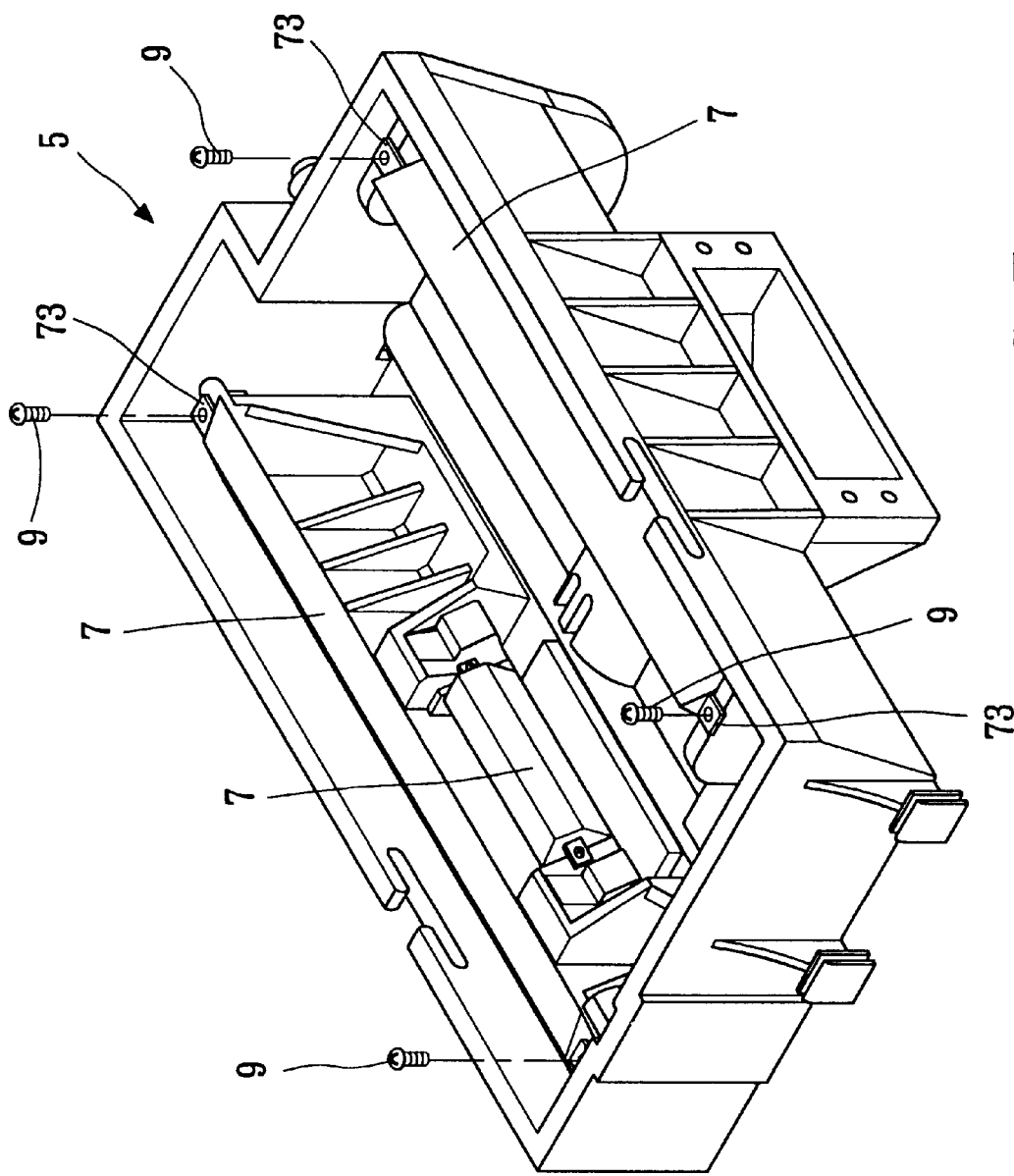
FIG. 7 is a perspective view showing that the optical reflection panel of the present invention is installed in an optical reflection module of a scanner.

The inclined lock lug 73 is to facilitate the assembling procedure. That is, when installing the optical reflection panel 7 in the module 5, in the case that it si required that the reflection panel 7 should be installed by an inclination angle, with the lock lug of the first embodiment, the lateral end of the optical reflection module 5 must be formed with an inclined lock seat. Accordingly, the assembling procedure will be limited by the space of the optical reflection module and operation angle. However, with the inclined lock lug 73 of the second embodiment, the lateral end of the optical reflection module 5 only needs to be formed with a horizontal lock seat (referring to FIG. 7). The lock lug 73 can be rested on the horizontal lock seat and easily secured by a screw 9. Accordingly, the assembling procedure can be more easily accomplished and after locked, the reflection surface of the optical reflection panel 7 will be naturally positioned by a desired inclination angle.

Figure 8:
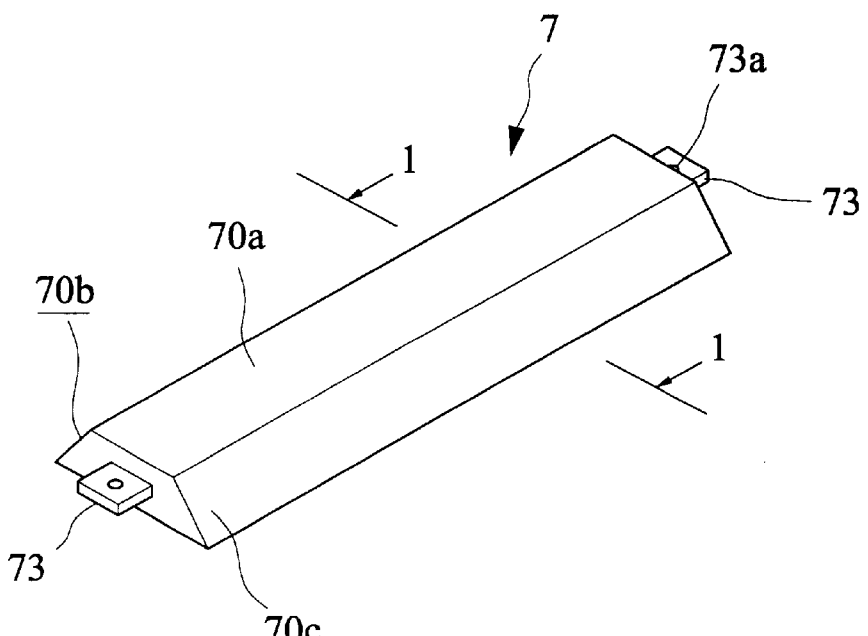
FIG. 8 is a perspective view of a third embodiment of the optical reflection panel of the present invention.

As shown in FIG. 8, the substrate 70 of the optical reflection panel 7 includes a planar surface 70a, a first inclined surface 70b, and a second inclined surface 70c. The first inclined surface 70b and the second inclined surface 70c are formed on opposite sides of the planar surface 70a at predetermined inclined angles.

Figure 9:
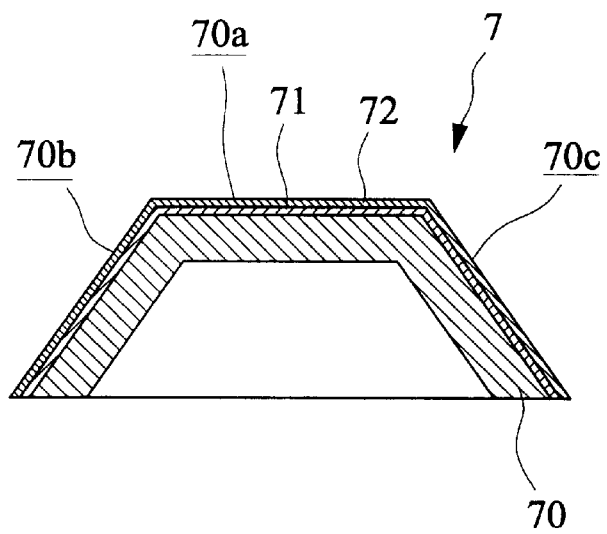
FIG. 9 is a cross sectional view of the optical reflection panel taken along line 1—1 of FIG. 8.

As described in the previous embodiment of the invention, an adherent layer 71 is coated on the planar surface 70a, and then an optical reflection layer 72 is formed on the adherent layer 71. In the third embodiment of the present invention, both the first inclined surface 70b and the second inclined surface 70c additionally include an adherent layer 71 and an optical reflection layer 72, as shown in FIG. 9.

Figure 10:
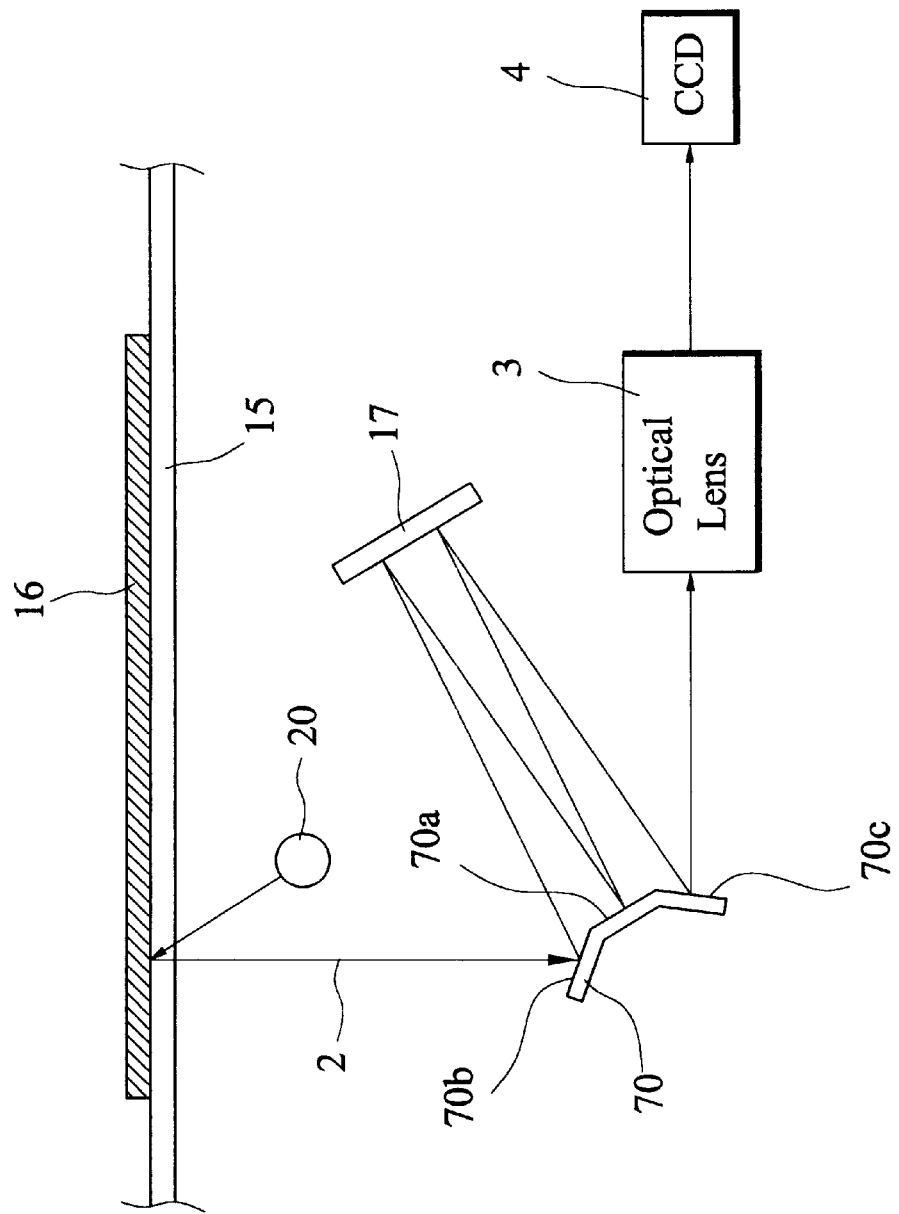
FIG. 10 is a schematic diagram showing the optical reflection panel of the third embodiment of the present invention is arranged in an optical scanner.

FIG. 10 is a schematic diagram showing the optical reflection panel of the third embodiment of the present invention arranged in an optical scanner. The scanner includes a light source 20 capable of generating a scanned light beam 2 to a document 16 to be scanned. The document 16 is placed on a transparent document supporting plate 15.

The light beam 2 reflected by the document 16 is first projected to the first inclined surface 70b. Then, the light beam 2 is reflected by a reflection mirror 17 arranged in the scanner, the planar surface 70a, the reflection mirror 17, the second inclined surface 70c in sequence. Finally, the light beam 2 projects to the image sensing element 4 through an optical lens 3.

In conventional scanner, at least three or four reflection mirrors are required to provide necessary optical reflection. By means of the optical reflection panel 7 of this embodiment, it is possible to effectively minimize the numbers of reflection mirrors in a scanner.

In conclusion, the optical reflection panel of the present invention can achieve the same optical reflection function as the conventional glass reflection mirror, while being manufactured at low cost. In addition, the reinforcing structure of the optical reflection panel ensures that the deformation amount of the optical reflection panel meets the same standards as the traditional glass reflection mirror.

It is to be understood that the above description and drawings are only used for illustrating some embodiments of the present invention, not intended to limit the scope thereof. Any variation and derivation from the above description and drawings should be included in the scope of the present invention.

I claim:

1. An optical reflection panel for an image scanner for reflecting a light beam and comprising:
   a) an elongated substrate of thermosetting plastic material having two opposite end portions, a first planar surface with two opposite side edges, a second planar surface extending obliquely to the first planar surface from a first of the two opposite side edges, and a third planar surface extending obliquely to the first planar surface from a second of the two opposite side edges;
   b) a metallic optical reflecting layer on each of the first, second and third planar surfaces;
   c) a reinforcing structure integrally formed on the elongated substrate on sides of the first, second and third planar surfaces located opposite from the metallic optical reflecting layer; and,
   d) a lock lug extending from each of the two opposite end portions of the substrate.

2. The optical reflection panel of claim 1 wherein the reinforcing structure comprises at least one longitudinal reinforcing rib extending along a longitudinal axis of the elongated substrate and at least one transverse reinforcing rib extending perpendicular to the longitudinal axis.

3. The optical reflection panel of claim 2 further comprising a plurality of transverse reinforcing ribs.

4. The optical reflection panel of claim 1 wherein the metallic optical reflecting layer on each of the first, second and third planar surfaces comprises a layer of aluminum.

5. The optical reflection panel of claim 1 further comprising a layer of adherent material between the metallic optical reflecting layer and the first, second and third planar surfaces.

6. The optical reflection panel of claim 5 wherein the adherent material comprises cyanuric amine material.

7. The optical reflection panel of claim 1 wherein the thermosetting plastic material comprises a fiberglass reinforced polyester resin material.

8. The optical reflection panel of claim 1 wherein each lock lug lies in a plane parallel to the first planar surface.

9. The optical reflection panel of claim 1 wherein each lock lug lies in a plane extending obliquely to the first planar surface.

10. An optical scanner comprising:
   a) a transparent plate for supporting a document to be scanned on a first side thereof;
   b) a light source for generating a scanning light beam;
   c) a reflection mirror;
   d) an optical lens; and,
   e) an optical reflection panel comprising:
      i) an elongated substrate of thermosetting plastic material having two opposite end portions, a first planar surface with two opposite side edges, a second planar surface extending obliquely to the first planar surface from a first of the two opposite side edges, and a third planar surface extending obliquely to the first planar surface from a second of the two opposite side edges;
      ii) a metallic optical reflecting layer on each of the first, second and third planar surfaces;
      iii) a reinforcing structure integrally formed on the elongated substrate on sides of the first, second and third planar surfaces located opposite from the metallic optical reflecting layer; and,
      iv) a lock lug extending from each of the two opposite end portions of the substrate;
   the optical reflection panel located such that light from the light source reflected from the document is reflected from the reflecting layer on the second planar surface onto the reflection mirror, from the reflection mirror onto the reflecting layer on the first planar surface, from the first planar surface onto the reflection mirror, from the reflection mirror onto the reflecting layer on the third planar surface, and from the third planar surface onto the optical lens.

11. The optical reflection panel of claim 10 wherein the reinforcing structure comprises at least one longitudinal reinforcing rib extending along a longitudinal axis of the elongated substrate and at least one transverse reinforcing rib extending perpendicular to the longitudinal axis.

12. The optical reflection panel of claim 11 further comprising a plurality of transverse reinforcing ribs.

13. The optical reflection panel of claim 10 wherein the metallic optical reflecting layer on each of the first, second and third planar surfaces comprises a layer of aluminum.

14. The optical reflection panel of claim 10 further comprising a layer of adherent material between the metallic optical reflecting layer and the first, second and third planar surfaces.

15. The optical reflection panel of claim 14 wherein the adherent material comprises cyanuric amine material.

16. The optical reflection panel of claim 10 wherein the thermosetting plastic material comprises a fiberglass reinforced polyester resin material.

17. The optical reflection panel of claim 10 wherein each lock lug lies in a plane parallel to the first planar surface.

18. The optical reflection panel of claim 10 wherein each lock lug lies in a plane extending obliquely to the first planar surface.

* * * * *